Jan. 28, 1964　　　　R. H. LEE　　　　3,119,934

GENERATOR CONTROL MEANS

Filed Dec. 4, 1961

INVENTORS.
ROBERT H. LEE
WALDO J. FRIERDICH
BY
*Alfred W. Petchaft*
ATTORNEY

United States Patent Office 3,119,934
Patented Jan. 28, 1964

3,119,934
GENERATOR CONTROL MEANS
Robert H. Lee, Appleton, Wis., and Waldo J. Frierdich, Highland, Ill., assignors to Basler Electric Company, Highland, Ill., a corporation of Illinois
Filed Dec. 4, 1961, Ser. No. 156,862
6 Claims. (Cl. 307—78)

This invention relates to generator output controls and, more particularly, to control means for causing an alternating current generating system to maintain substantially constant current under overload conditions of large magnitudes. Many types of alternating current generator systems and particularly transistorized devices, such as a transistor-inverter, will be seriously damaged by excessive currents which may be drawn through the output circuit under overload conditions. For example, if a particular transistor happens to have a load-limit of twenty-five amperes, then a twenty-six ampere current may destroy such a transistor. Conventional types of mechanically driven generators are not quite as sensitive to overload conditions as a transitsorized device, but even conventional generators will be damaged if overloaded to any material degree.

Of course, many types of current-control devices have been developed with varying degrees of success, but very few such devices achieve any marked degree of efficiency. Moreover, current-control devices which are at all efficient tend to be bulky and are relatively expensive to manufacture and maintain.

It is, therefore, the primary object of the present invention to provide a current-limiting device for use with alternating current generators which will maintain the generator output at substantially constant current over a widely varying range of overload conditions.

It is another object of the present invention to provide a control-device of the type stated which is extremely efficient and precise in its electrical characteristics.

It is also an object of the present invention to provide a control-device of the type stated which is comparatively inexpensive to manufacture and maintain.

With the above and other objects in view, our invention resides in the novel features of form, construction, arrangement, and combination of parts presently described and pointed out in the claims.

In the accompanying drawing (one sheet)—

Figure 1:
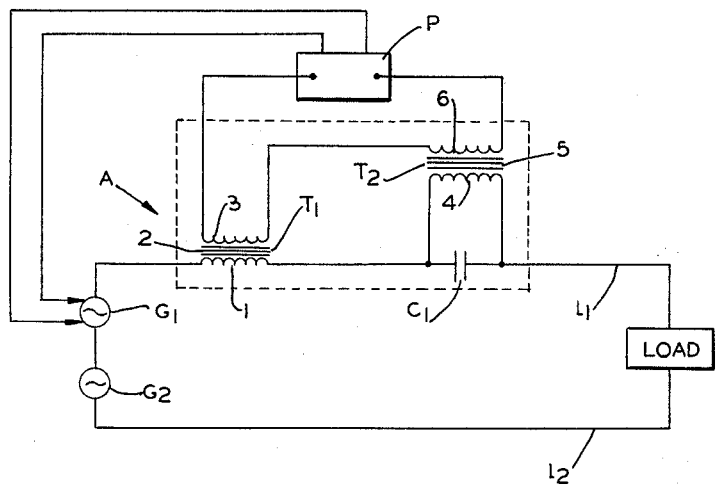
Figure 2:
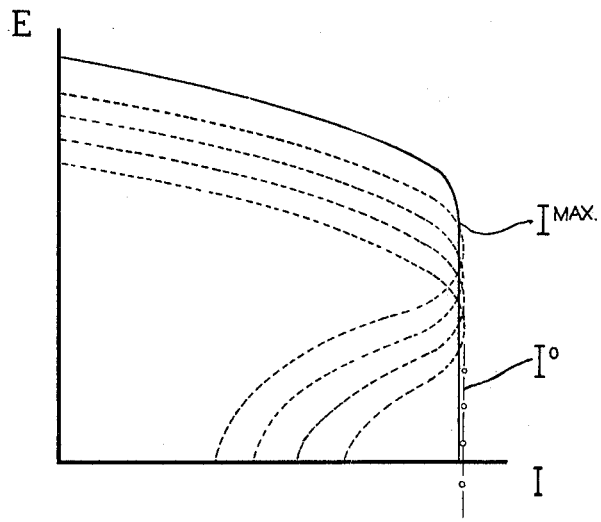

FIG. 1 is a schematic wiring diagram of a control device constructed in accordance with and embodying the present invention; and FIG. 2 is a typical voltage-amperage curve illustrating the function and operation of the control device shown in FIG. 1.

In alternating current generator systems two substantially identical series-connected generators $G_1$, $G_2$, can be employed and the phase angle of one such generator, as, for example, the generator $G_1$ can be rotated in order to produce an output of some desired value. Some form of capacitance and inductance can be placed in series within the output circuit for control purposes. However, such circuit arrangement will, under overload conditions, function in a manner represented by the cut-back curves shown in dotted lines in FIG. 2. In other words, as the voltage drops under heavy overload conditions, the current will increase gradually to the line $I^0$ on the graph as shown in FIG. 2. When the current reaches the limit $I^0$, the current will start to drop very rapidly back toward zero. This is an extremely undesirable form of regulation for many types of loads, such as motor-starting loads, for instance. In a motor-starting circuit, if the load current follows one of the typical dotted line curves, as shown in FIG. 2, it will be virtually impossible to get the motor started.

Accordingly, a current-control device A is provided comprising two transformers $T_1$, $T_2$, and a capacitor $C_1$. The transformer $T_1$ consists of a primary coil 1, a core 2, and a secondary coil 3. Similarly, the transformer $T_2$ consists of a primary coil 4, a core 5, and a secondary coil 6.

The primary coil 1 of the transformer $T_1$ is connected in series with the load output line $L_1$ which is connected to one side of the load. As will be seen by reference to FIG. 1, the capacitor $C_1$ is interposed in the line $L_1$ and the primary coil 4 of the transformer $T_2$ is connected in parallel across the capacitor $C_1$. The other side of the load is connected directly through the load line $L_2$ to one output terminal of the generator $G_2$. The secondary coils 3 and 6 of the transformers $T_1$, $T_2$, respectively, are connected in series with each other and are also connected to a conventional phase regulator P which controls the phase of the generator $G_1$ responsive to the signal developed across the series-connected secondary coils 3 and 6.

The transformer $T_1$ is designed so as to function as a linear reactor forming a series-timed circuit with the capacitor $C_1$ at the generator-frequency. The transformer $T_2$ is a high impedance transformer designed to saturate at some selected voltage value. Moreover, the core 5 of the transformer $T_2$ is constructed with a small gap to prevent direct current saturation. As long as the load current is relatively low and the voltage across the transformer $T_2$ is below the selected value, the impedance of the transformer $T_2$ will remain high and no substantial voltage will appear across the series-connected secondary coils 3 and 6. However, when the desired current limit is reached, that is to say, the current $I^{max}$, the voltage across the transformer $T_2$ increases to, but cannot exceed, the selected value. Thereupon, an output signal will appear across the series-connected secondary coils 3 and 6, and the phase angle regulator P will function responsive to such signal to change the phase angle of the generator $G_1$ with respect to the generator $G_2$ in such manner as to maintain the current at the constant value of $I^{max}$ so long as the overload condition obtains.

It has also been found that the output signal appearing across the series-connected secondary coils 3 and 6, can be applied to a conventional field coil regulating system of a single generator or to a transistorized generator system with equally effective results.

It should be understood that changes and modifications in the form, construction, arrangement, and combination of the several parts of the generator control means may be made and substituted for those herein shown and described without departing from the nature and principle of our invention.

Having thus described our invention, what we claim and desire to secure by Letters Patent is:

1. A control device for an alternating current generator having output leads connected to a load; said control device including a first transformer having a primary and a secondary, said primary being interposed in series in one of the output leads of the generator, a capacitor interposed in said last-named output lead in series with said primary, a second transformer having a primary and secondary, the primary of the second transformer being in parallel across the capacitor, the two secondaries being in series whereby to generate a control signal responsive to overload conditions across the output leads, and control means connected across said secondaries to receive said signal and correspondingly vary the magnitude of the generator output.

2. A control device for an alternating current generator having output leads connected to a load; said control device including a first transformer having a primary and a secondary, said primary being interposed in series in one of the output leads of the generator, a capacitor interposed in said last-named output lead in series with said primary, a second transformer having a primary and secondary, the primary of the second transformer being in parallel across the capacitor, the two secondaries being in series whereby to generate a control signal responsive to overload conditions across the output leads, and control means connected across said secondaries to receive said signal and correspondingly vary the phase angle of the generator output.

3. A control device for an alternating current generating system having output leads which are connected to a load and which are supplied by two series-connected generators which are subject to output control means by varying the phase angle of at least one of such generators; said control device including a first transformer having a primary and a secondary, said primary being interposed in series in one of the output leads of the generating system, a capacitor interposed in said last named output lead in series with said primary, a second transformer having a primary and secondary, the primary of the second transformer being in parallel across the capacitor, the two secondaries being in series whereby to generate a control signal responsive to overload conditions across the output leads, and phase control means connected across said secondaries to receive said signal and correspondingly vary the phase angle of the generator subject to phase control.

4. A control device for an alternating current generating system having output leads which are connected to a load and which are supplied by two series-connected generators which are subject to output control by means of varying the phase angle of at least one of such generators; said control device including a linear transformer having a primary and a secondary, said primary being interposed in series in one of the output leads of the generating system, a capacitor interposed in said last named output lead in series with said primary, a second transformer having a primary and secondary, the primary of the second transformer being in parallel across the capacitor, the two secondaries being in series whereby to generate a control signal responsive to overload conditions across the output leads, and phase control means connected across said secondaries to receive said signal and correspondingly vary the phase angle of the generator subject to phase control.

5. A control device for an alternating current generating system having output leads which are connected to a load and which are supplied by two series-connected generators which are subject to output control by means of varying the phase angle of at least one of such generators; said control device including a first transformer having a primary and a secondary, said primary being interposed in series in one of the output leads of the generating system, a capacitor interposed in said last named output lead in series with said primary, a saturable transformer having a primary and secondary, the primary of the saturable transformer being in parallel across the capacitor, the two secondaries being in series whereby to generate a control signal responsive to overload conditions across the output leads, and phase control means connected across said secondaries to receive said signal and correspondingly vary the phase angle of the generator subject to phase control.

6. A control device for an alternating current generating system having output leads which are connected to a load and which are supplied by two series-connected generators which are subject to output control by means of varying the phase angle of at least one of such generators; said control device including a linear transformer having a primary and a secondary, said primary being interposed in series in one of the output leads of the generating system, a capacitor interposed in said last named output lead in series with said primary, a saturable transformer having a primary and secondary, the primary of the saturable transformer being in parallel across the capacitor, the two secondaries being in series whereby to generate a control signal responsive to overload conditions across the output leads, and phase control means connected across said secondaries to receive said signal and correspondingly vary the phase angle of the generator subject to phase control.

References Cited in the file of this patent

UNITED STATES PATENTS

| | | |
|---|---|---|
| 2,650,341 | Jones | Aug. 25, 1953 |
| 3,076,136 | Moerlein | Jan. 29, 1963 |